Sept. 22, 1931.  O. HUBMANN ET AL  1,824,483
APPARATUS FOR OPERATING SHAFT FURNACES IN THE
THERMAL TREATMENT OF GRANULAR MATERIAL
Filed March 26, 1930  2 Sheets-Sheet 2

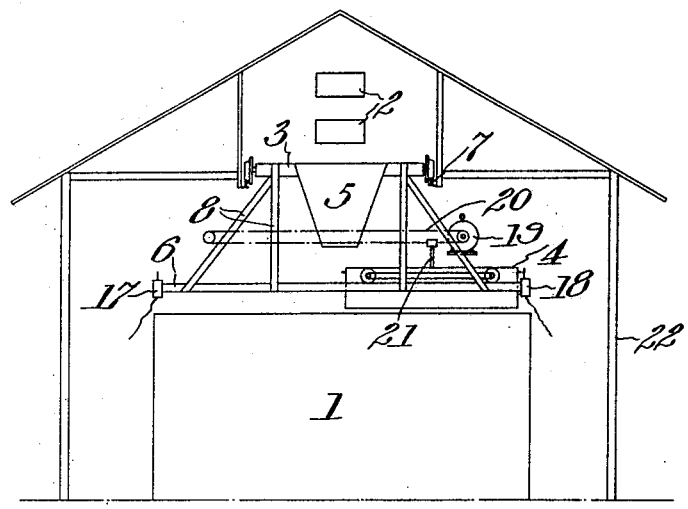
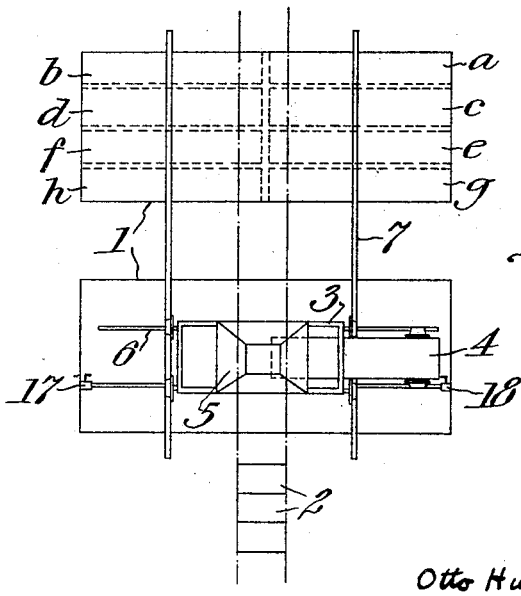

Patented Sept. 22, 1931

1,824,483

UNITED STATES PATENT OFFICE

OTTO HUBMANN, OF FRANKFORT-ON-THE-MAIN, AND FRANZ VOERKEL, OF HOCHST-ON-THE-MAIN, GERMANY

APPARATUS FOR OPERATING SHAFT FURNACES IN THE THERMAL TREATMENT OF GRANULAR MATERIAL

Application filed March 26, 1930, Serial No. 439,165, and in Germany February 3, 1927.

This invention relates to a method and to a device for operating shaft furnaces in the thermal treatment of granular material.

The object of the invention is to provide for an even distribution of granular material over the entire cross section of shaft furnaces and the like, thereby preventing the separation into component parts of the mixtures charged, which always occurs during the charging at one or several places of the furnace. This separation into component parts is especially to be avoided when mixtures of granular material are to be chemically or thermally treated with gases as a uniform passage of the gases through the material is otherwise not obtained. The uniform passage of the gases through the material is, however, absolutely necessary in order that the chemical or thermal reaction may be properly controlled.

An even distribution of the material over the entire cross-section of the shaft furnace is obtained according to the invention by dividing this entire cross-section into several equal areas in each of which the material is charged periodically in equal amounts. It is of advantage to charge each unit area of the cross-section only with small amounts of material, thereby obtaining an even distribution of the material over the entire cross-section of the shaft even when the granular size of the material supplied is subject to variation. When working with several shafts the distribution of the material to be charged is likewise improved by distributing the material supplied to the plant in the period between two throwings-off upon the same part of the furnace cross-section over two or more shafts thereby obtaining an even distribution of comparatively thin layers of material over a comparatively great surface. Then there is no danger that clumps of fine-grained material, disturbing or preventing the passage of gas, will be formed in the furnace even when, for example, only fine-grained material is charged, which is temporarily the case when a material reservoir is emptied, as the material generally segregates in the reservoir.

The material to be charged is generally furnished to the plant by conveyers or endless belts above the shaft furnaces. A suitable device for executing the new method consists in the arrangement of a movable carriage below the conveyer, said carriage being movable above the furnaces in the direction of motion of the conveyer and carrying transporting means, for example, an endless belt or the like movable transversely to the direction of motion of the conveyer. The material is taken from the conveyer by this transporting means and periodically thrown upon the unit cross-section areas of the shaft furnaces. In order to obtain absolutely uniform charges it is advisable to drive and to control this mechanism automatically.

Suitable equipment for carrying out the process of the invention is shown for purposes of illustration in the accompanying drawings of which:

Fig. 1 is an elevation, and

Fig. 2 is a plan of the equipment;

Figure 3:
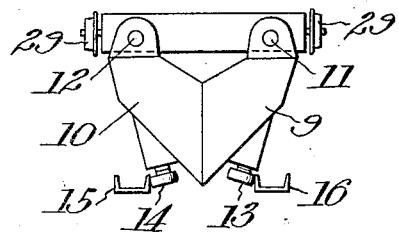
Fig. 3 is a side view of the bucket 4 of Figs. 1 and 2 in the closed position.
Figure 4:
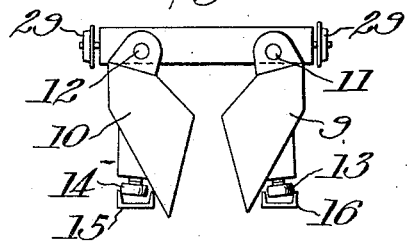
Fig. 4 is a side view of the bucket 4 in the open position.
Figure 5:
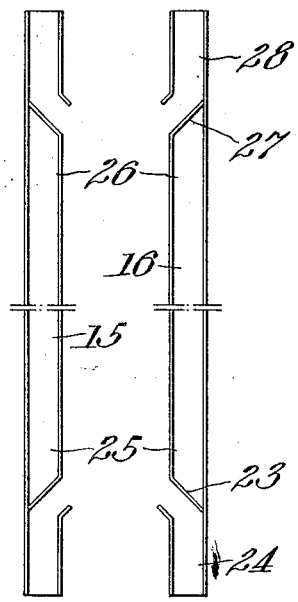
Fig. 5 is a plan of the track which operates the bucket 4.

Figs. 1 and 2 show a plurality of shaft furnaces 1 arranged in a row. Truck 3 runs above the furnaces on rails 7. The truck 3 consists in general of a frame 8, a charging hopper 5, and the charging bucket 4. The bucket 4, shown more particularly in Figures 3 and 4, comprises two opposed halves 9 and 10, pivoted on pins 11 and 12. The rollers 13 and 14 cooperate with the tracks 15 and 16, more particularly shown in Fig. 5, to open and close the bucket. The bucket is carried by means of wheels 29 on rails 6, which have reversing switches 17 and 18 at their ends. The bucket is propelled by a motor 19, operating the endless chain 20, which engages the bucket by means of drivers 21. Above the charging hopper is located a conveying device 2, such as a traveling belt. The charging device is supported, and the whole equipment is protected from the weather, by the building 22.

In operation the charging of the furnaces 1 is effected as follows: The truck 3 is positioned over one of the furnaces. By means of any of the well-known unloading devices (not shown in the drawings), which are attached to the truck 3 and move with it, the material to be charged is unloaded from conveyer 2 into the charging hopper 5. The charging bucket 4 is movably located under the funnel. The equipment in the example shown is so arranged and operated that the bucket 4 is successively brought and emptied over areas $a$, $b$, $c$, $d$, $e$, $f$, $g$, and $h$. For example, the truck 3 is first brought into position over the furnace so that the bucket 4 travels over the area $a$—$b$ of the furnace. The charging bucket is continually in motion during the charging operation. Considering it as starting from the center line of the truck 3, it first travels to the right. The material is continuously falling from the hopper 5 into the bucket and fills it by the time it reaches the end stops. Shortly before the end of the travel, the rollers 13 and 14, which are pressed against the inner flange 25 of rails 15 and 16 by the weight of the bucket halves 9 and 10, are allowed to fly outwardly by the switch 23 until they rest on the outer flanges 24 of the rails. In this way the bucket is opened so that the charge can fall into the furnace just as the bucket reaches the end position corresponding substantially to area $a$. In this position the bucket hits the switch 18, which reverses the motor 19 so that the endless chain now runs in the opposite direction and pulls the bucket 4 to the left. On the return the bucket is closed and the filling of the bucket with material from the hopper begins, continuing until the bucket covers area $b$, when the bucket is again opened by similar mechanism (cooperation of rollers 13 and 14 with tracks 26, 27 and 28), as described above. On emptying the bucket hits the switch 17 and a reversal of motor 19 follows so that the charging bucket again runs to the right, whereby it is closed by the cooperation of the rollers with the rails 26, 27, 28, and is filled from the hoppers. During the movement of the bucket to the right, the truck 3 is simultaneously moved so that the bucket can now feed areas $c$ and $d$. In the same way a corresponding amount of material is charged at areas $c$ and $d$, and then at areas $e$ and $f$, and so on. The movement of charging truck 3 can be effected either by hand or by well-known automatic mechanism. When the bucket 4 is in the emptying position as shown in Fig. 1 the material can wholly or partly fall directly from the hopper 5 into the furnace. The amounts of material which get into the furnace in this way are so small that the uniformity of the charging is not perceptibly affected. Instead of bucket 4 any other conveying device may be used, such as a flat band which in its end positions covers the areas $a$, $b$, etc., or a traveling belt, which continually unloads the material as it moves.

The new method is especially adapted for operating with shaft furnaces of rectangular cross-section having no special closure or feeding funnel, the closure against the atmosphere being effected by the material itself. Such shaft furnaces are, for example, used for drying combustibles. The method of the present invention makes possible an even and uniform passage of the gases through the material even when the granular size of the material is subject to variation. Drying or distilling processes may therefore be carried out in shaft furnaces by charging them according to the present invention. This was not hitherto possible as a uniform passage of the gases through the material could not be obtained when the granular size of the charged material is varied.

This application is a continuation-in-part of our application Serial No. 244,996, filed January 6, 1928.

We claim:—

1. A device for charging shaft furnaces with granular material comprising a conveyer running above the furnaces, a carriage below said conveyer and movable in the direction of motion of said conveyer, a reservoir on said carriage, a container positioned to be filled from said reservoir and mounted on said carriage, and means to move said container transversely to the direction of motion of said carriage, said container being provided with elements cooperating with guiding means to automatically open the bottom of said container in its end positions.

2. A device for charging shaft furnaces with granular material comprising a conveyer running above the furnaces, a carriage below said conveyer and movable in the direction of motion of said conveyer, a reservoir on said carriage, a container positioned to be filled from said reservoir and mounted on said carriage, and means to move said container transversely to the direction of motion of said carriage, said container being provided with rollers cooperating with guiding rails to automatically open the bottom of said container in its end positions.

3. A device for charging shaft furnaces with granular material comprising a conveyer running above the furnaces, a carriage below said conveyer and movable in the direction of motion of said conveyer, a reservoir on said carriage, a container positioned to be filled from said reservoir and mounted on said carriage, means to move said container transversely to the direction of motion of said carriage, means to discharge said container in its end positions and means to reverse the direction of motion of said container at its end positions.

4. A device for charging shaft furnaces with granular material comprising a conveyer running above the furnaces, a carriage below said conveyer and movable in the direction of motion of said conveyer, a reservoir on said carriage, a container positioned to be filled from said reservoir and mounted on said carriage, means to move said container transversely to the direction of motion of said carriage, means to discharge said container in its end positions and reversing switches adapted to be operated by contact with said container at its end position and to reverse the direction of motion thereof.

5. A device for charging shaft furnaces with granular material comprising a conveyer running above the furnaces, a carriage below said conveyer and movable in the direction of motion of said conveyer, a reservoir on said carriage, transporting means mounted on said carriage and positioned to be filled from said reservoir, means to uniformly move said transporting means transversely to the direction of motion of said carriage while material is running from said reservoir into said transporting means and means to feed the furnace from said transporting means.

6. A device for charging shaft furnaces with granular material comprising a conveyer running above the furnaces, a carriage below said conveyer and movable in the direction of motion of said conveyer, a reservoir on said carriage, a container mounted on said carriage and positioned to be filled from said reservoir, means to uniformly move said container transversely to the direction of motion of said carriage while material is running from said reservoir into said container and means to discharge said container in its end positions.

In testimony whereof, we affix our signatures.

OTTO HUBMANN.
FRANZ VOERKEL.